United States Patent
Hill et al.

(10) Patent No.: US 9,617,848 B2
(45) Date of Patent: Apr. 11, 2017

(54) WELL MONITORING BY MEANS OF DISTRIBUTED SENSING MEANS

(75) Inventors: David John Hill, Dorset (GB); Magnus McEwen-King, Hampshire (GB); Patrick Tindell, Dorset (GB)

(73) Assignee: Optasense Holdings Limited (GB)

( * ) Notice: Subject to any disclaimer, the term of this patent is extended or adjusted under 35 U.S.C. 154(b) by 1178 days.

(21) Appl. No.: 13/320,884

(22) PCT Filed: May 27, 2010

(86) PCT No.: PCT/GB2010/001056
§ 371 (c)(1),
(2), (4) Date: Nov. 16, 2011

(87) PCT Pub. No.: WO2010/136768
PCT Pub. Date: Dec. 2, 2010

(65) Prior Publication Data
US 2012/0057432 A1 Mar. 8, 2012

(30) Foreign Application Priority Data

May 27, 2009 (GB) .................................. 0909038.2
Nov. 13, 2009 (GB) .................................. 0919915.9

(51) Int. Cl.
*G01V 1/50* (2006.01)
*E21B 47/16* (2006.01)
(Continued)

(52) U.S. Cl.
CPC ........ *E21B 47/16* (2013.01); *E21B 43/11857* (2013.01); *E21B 43/26* (2013.01);
(Continued)

(58) Field of Classification Search
CPC ............................................... G01D 5/35383
(Continued)

(56) References Cited

U.S. PATENT DOCUMENTS

| 6,268,911 B1 | 7/2001 | Tubel et al. |
| 6,618,148 B1 | 9/2003 | Pilgrim et al. |

(Continued)

FOREIGN PATENT DOCUMENTS

| EP | 1400818 | 3/2004 |
| GB | 2398805 | 7/2006 |

(Continued)

OTHER PUBLICATIONS

Stewart, "Acoustic Emission Monitoring During Hydraulic Fracturing", SPE Formulation Evaluation (Paper 20970), Jun. 1992, pp. 139-144, XP002651924.

(Continued)

*Primary Examiner* — Albert Wong
(74) *Attorney, Agent, or Firm* — McDonnell Boehnen Hulbert & Berghoff LLP

(57) ABSTRACT

This application describes methods and apparatus for downhole monitoring in real-time. The method involves interrogating an unmodified optic fiber (102) arranged along the path of a well bore (106) to provide a distributed acoustic sensor and sampling data gathered from a plurality of sensing portions of the fiber. The sampled data is then processed to provide a real-time indication of the acoustic signals detected by the sensing portions of the fiber. The real-time indication provides information to an operator or controller of the downwell process with real-time feedback data regarding what is happening during the downwell process which allows the identification of any problems and adjustment of the process parameters.

21 Claims, 4 Drawing Sheets

(51) Int. Cl.
*E21B 43/1185* (2006.01)
*E21B 43/26* (2006.01)
*E21B 47/10* (2012.01)
*E21B 47/12* (2012.01)
*G01H 9/00* (2006.01)

(52) U.S. Cl.
CPC .......... *E21B 47/101* (2013.01); *E21B 47/123* (2013.01); *G01V 1/50* (2013.01); *G01H 9/004* (2013.01); *G01V 2210/1429* (2013.01); *G01V 2210/646* (2013.01)

(58) Field of Classification Search
USPC ...................... 340/854.7; 166/250.08, 250.01
See application file for complete search history.

(56) References Cited

U.S. PATENT DOCUMENTS

| | | |
|---|---|---|
| 2004/0104029 A1 | 6/2004 | Martin |
| 2006/0028637 A1 | 2/2006 | Payton |
| 2009/0003133 A1 | 1/2009 | Dalton et al. |
| 2009/0114386 A1 | 5/2009 | Hartog et al. |

FOREIGN PATENT DOCUMENTS

| | | |
|---|---|---|
| GB | 2442745 | 4/2008 |
| WO | WO2005/033465 | 4/2005 |
| WO | WO2008/098380 | 8/2008 |
| WO | WO2009/056855 | 5/2009 |
| WO | WO2010/020795 | 2/2010 |
| WO | WO2010/116119 | 10/2010 |
| WO | WO2011/058313 | 5/2011 |
| WO | WO2011/058314 | 5/2011 |

OTHER PUBLICATIONS

Unpublished U.S. Appl. No. 13/320,877, filed Nov. 16, 2011 entitled: Well Monitoring by Means of Distributed Sensing Means.
Preliminary Amendment filed on Nov. 16, 2011 in U.S. Appl. No. 13/320,877.
Unpublished U.S. Appl. No. 13/320,882, filed Nov. 16, 2011 entitled: Fracture Monitoring.
Preliminary Amendment filed on Nov. 16, 2011 in U.S. Appl. No. 13/320,882.

WELL MONITORING BY MEANS OF DISTRIBUTED SENSING MEANS

FIELD OF THE INVENTION

The present invention relates to monitoring of production wells such as oil and gas wells. Such monitoring is often referred to as downhole monitoring. In particular, the present invention relates to downhole monitoring using distributed acoustic sensing (DAS).

BACKGROUND OF THE INVENTION

Fibre optic sensors are becoming a well-established technology for a range of applications, for example geophysical applications. Fibre optic sensors can take a variety of forms, and a commonly adopted form is to arrange a coil of fibre around a mandrel. Point sensors such as geophones or hydrophones can be made in this way, to detect acoustic and seismic data at a point, and large arrays of such point sensors can be multiplexed together using fibre optic connecting cables, to form an all fibre optic system. Passive multiplexing can be achieved entirely optically, and an advantage is that no electrical connections are required, which has great benefit in harsh environments where electrical equipment is easily damaged.

Fibre optic sensors have found application in downhole monitoring, and it is known to provide an array of geophones in or around a well to detect seismic signals with the aim of better understanding the local geological conditions and extraction process. A problem with such an approach is that geophones tend to be relatively large and so installation downhole is difficult. In addition geophones tend to have limited dynamic range.

WO 2005/033465 describes a system of downhole acoustic monitoring using a fibre having a number of periodic refractive index perturbations, for example Bragg gratings. Acoustic data is retrieved by portions of the fibre and used to monitor downhole conditions.

There are numerous different processes involved in formation and operation of a production well. Typically, to form a well, a borehole is drilled to the rock formation and lined with a casing. The outside of the casing may be filled with cement so as to prevent contamination of aquifers etc. when flow starts. Once the well bore has been drilled and lined the casing is typically perforated. Perforation involve firing a series of perforation charges, i.e. shaped charges, from within the casing that create perforations through the casing and cement that extend into the rock formation. Once perforation is complete, in some wells in is necessary to fracture the rock to provide a flow path for the oil/gas. Typically the rock is fractured in a hydraulic fracturing process by pumping a fluid, such as water, down the well under high pressure. This fluid is therefore forced into the perforations and, when sufficient pressure is reached, causes fracturing of the rock. A solid particulate, such as sand, is typically added to the fluid to lodge in the fractures that are formed and keep them open. Such a solid particulate is referred to as proppant. The well may be perforated in a series of sections, starting with the furthest section of well from the well head. Thus when a section of well has been perforated it may be blocked off by a blanking plug whilst the next section of well is perforated.

Once all perforations are complete the blanking plugs may be drilled out and production tubing installed. Sand screens and/or gravel packs may be placed to filter the in-flow and packers may be placed between the production tubing and the casing. In wells where the reservoir pressure is insufficient it may be necessary to install artificial lift mechanisms.

Once the well formation is completed production flow can be started.

During the formation of the well there are therefore many downhole processes that are conducted and generally very little information is available regarding what is happening down the well. Conditions at the top of the well can be monitored, such as flow rate of a material into or out of the well. Distance into a well bore may be determined by measuring deployment of a cable attached to a piece of apparatus. However it is generally very difficult to receive feedback from the location of the process itself. The well conditions are normally hostile and especially so when fracturing or perforation is taking place for instance. Further, even when the well is complete, there is a need for various tests and monitoring to take place, which often require halting production and deploying wire line logging tools.

SUMMARY OF THE INVENTION

It is an object of the present invention to provide improved downhole monitoring systems and methods.

According to a first aspect of the invention there is provided a method of monitoring a downhole process comprising: interrogating an optic fibre arranged along the path of a well bore to provide distributed acoustic sensing; sampling data gathered from a plurality of longitudinal portions of said fibre; and processing said data to provide a real-time indication of the acoustic signals detected by at least one longitudinal sensing portion of said fibre.

Distributed acoustic sensing (DAS) offers an alternative form of fibre optic sensing to point sensors, whereby a single length of longitudinal fibre is optically interrogated, usually by one or more input pulses, to provide substantially continuous sensing of vibrational activity along its length. Optical pulses are launched into the fibre and the radiation backscattered from within the fibre is detected and analysed. Rayleigh backscattering is most usually detected. By analysing the radiation backscattered within the fibre, the fibre can effectively be divided into a plurality of discrete sensing portions which may be (but do not have to be) contiguous. Within each discrete sensing portion mechanical vibrations of the fibre, for instance from acoustic sources, cause a variation in the amount of radiation which is backscattered from that portion. This variation can be detected and analysed and used to give a measure of the intensity of disturbance of the fibre at that sensing portion. As used in this specification the term "distributed acoustic sensor" will be taken to mean a sensor comprising an optic fibre which is interrogated optically to provide a plurality of discrete acoustic sensing portions distributed longitudinally along the fibre and acoustic shall be taken to mean any type of mechanical vibration or pressure wave, including seismic waves. The method may therefore comprise launching a series of optical pulses into said fibre and detecting radiation Rayleigh backscattered by the fibre; and processing the detected Rayleigh backscattered radiation to provide a plurality of discrete longitudinal sensing portions of the fibre. Note that as used herein the term optical is not restricted to the visible spectrum and optical radiation includes infrared radiation and ultraviolet radiation.

The single length of fibre is typically single mode fibre, and is preferably free of any mirrors, reflectors, gratings, or (absent any external stimulus) any change of optical properties along its length, i.e. absent any designed optical variation along its length. This provides the advantage that an unmodified, substantially continuous length of standard fibre can be used, requiring little or no modification or preparation for use. A suitable DAS system is described in GB2442745 for example, the content of which is hereby incorporated by reference. Such a sensor may be seen as a fully distributed or intrinsic sensor as it uses the intrinsic scattering processed inherent in an optical fibre and thus distributes the sensing function throughout the whole of the optical fibre.

Since the fibre has no discontinuities, the length and arrangement of fibre sections corresponding to each channel is determined by the interrogation of the fibre. These can be selected according to the physical arrangement of the fibre and the well it is monitoring, and also according to the type of monitoring required. In this way, the distance along the fibre, or depth in the case of a substantially vertical well, and the length of each fibre section, or channel resolution, can easily be varied with adjustments to the interrogator changing the input pulse width and input pulse duty cycle, without any changes to the fibre. Distributed acoustic sensing can operate with a longitudinal fibre of 40 km or more in length, for example resolving sensed data into 10 m lengths. In a typical downhole application a fibre length of a few kilometers is usual, i.e. a fibre runs along the length of the entire borehole and the channel resolution of the longitudinal sensing portions of fibre may be of the order or 1 m or a few meters. As mentioned below the spatial resolution, i.e. the length of the individual sensing portions of fibre, and the distribution of the channels may be varied during use, for example in response to the detected signals.

In the method of the present invention distributed acoustic sensing is applied to monitoring of a downhole process to provide a real-time indication of the acoustic signals from at least one longitudinal sensing portion of the fibre in the vicinity of the downhole process. A real-time indication is, as the term is used in the present specification, an indication which is provided without any significant delay between the signal being detected by the fibre and the indication being generated. In other words the indication is a generally accurate representation of the acoustic signals being currently detected by the distributed acoustic sensor.

The skilled person will appreciate that there will inherently be some small delay involved in receiving the radiation backscattered from the relevant section of fibre as the radiation must travel back from the relevant part of the fibre where scattering occurs to the detector at the end of the fibre. Further there will be some small delays associated with operation of the detector, sampling of the data and processing of the data so as to provide an indication of the acoustic disturbances. However DAS sensing according to the present invention can provide an indication of the acoustic disturbances detected by sensing portions of the fibre without any significant delay. This can be achieved by using commercially available detectors and processors. In some arrangements the indications of an acoustic disturbance may be generated within a few seconds or less of the actual disturbance of the relevant section of fibre and may be generated within one second or less. In some arrangements the indication of acoustic disturbance may be generated within a few tens or hundreds of milliseconds or less (e.g. within 500 ms, 100 ms, 10 ms or less from the actual disturbance).

As the method provides a real-time indication of the acoustic signals from at least one longitudinal sensing portion of the fibre, the method can provide real-time feedback regarding the operation of the downhole process.

Most downhole processes will result in acoustic disturbances being generated. Detecting the acoustic disturbances can provide useful information regarding the operation of the process. The real-time indication of acoustic signals may reveal whether there is a problem with the downhole process. The indication may also be used as part of the control of the process, for instance, fabrication of the well may involve perforating a section of well, fracturing the rock around the perforations and then inserting a blanking plug to seal off that section of the well whilst another section is perforated. This process may be repeated several times to perforate various sections of the well. After all the perforations are complete it is necessary to drill out the blanking plugs. Conventionally the drilling process is performed with only limited understanding of where the drill is and how the drilling process is going. While drilling out any individual blanking plug, progress of the drill may be judged solely from knowledge of what is happening at the well head. The present invention can be used to monitor the sections of fibre in the vicinity of the drill as it advances through the well. The acoustic disturbances when the drill is simply passing through an empty section of well will be different to those generated when the drill is drilling through a blanking plug and thus a real-time indication of the acoustic disturbances may be used to control drill speed or progress, for example to determine when to stop the drill when it is through a blanking plug. The method may also be used to control the actual operation of the process, for instance the acoustic indication could be used to determine necessary adjustments to the drill operation for example.

Acoustic signals corresponding to a variety of downhole processes may usefully be detected, advantageously where operational feedback can alert to a potential problem and/or allow for control of the process. As non-limiting examples the method may be used to monitor any one of perforation charge placement; perforation charge firing; hydraulic fracturing; tool or apparatus deployment; drilling of plugs; and production flow.

As mentioned above perforation charge placement involves locating one or more perforation charges in the well in order to perforate sections of the well. Placing a perforation charge in the well may involve lowering the charge down any vertical sections and possibly moving a charge with a tractor in any horizontal section. In either case the acoustic disturbances generated in moving the charges can be used to track the location of the charges in the well and thus provide information about whether the charges are correctly located. Various other well processes also involve placing some apparatus, e.g. a tool, into the well to perform some process and again correct deployment of the apparatus that is correct location, orientation and/or general arrangement, may be important. The process of deploying tools can be monitored by using the method of the present invention and the real-time indication of the acoustic signals generated by the tool deployment may be used to determine when the tool is correctly deployed.

Firing of the perforation charges may also be monitored. Perforating a particular section of well may comprise firing a number of perforation charges from a string of such charges. These charges may be fired in a sequence. Providing a real-time indication of the acoustic signals generated during firing of a perforation charge may allow identification of problems associated with perforation, such as incorrect firing of a charge, incorrect location and/or orientation of a charge, insufficient perforation (for instance the intensity of the signal at various locations may indicate the amount of energy transmitted to the surrounding rock) or problems with the well casing (for example acoustic disturbances after the initial perforation event indicating collapse of a section of well casing or cement surround). This may allow the location or orientation of the charge string to be varied prior to another firing or result in the perforation series being terminated to allow for further investigation or remediation.

In some wells hydraulic fracturing is performed after perforation in order to fracture the rock and provide a flow path for the oil or gas to the well. Hydraulic fracturing involves forcing fluid into the well bore under pressure. The fluid typically contains solid material known as proppant which is added to keep the fractures open. The method of the present invention may be performed during the time that fluid and proppant is being forced down the well bore and can provide a real time indication of what is happening down the well. This can allow the operator to adjust flow parameters, stop the flow or add additional solid material as necessary based on the data from the DAS sensor.

Once formation of the well is completed production flow can be started. The flow of oil or gas within the well be also be monitored using the method of the present invention. In-flow of fluid, i.e. oil or gas, into the production tubing and flow of fluid (oil or gas) within the production tubing will generate acoustic disturbances which can be monitored. The real-time indication of acoustic signals may indicate where production in-flow is greatest and/or can identify any problems, such as flow out of the production tubing or blocked screens/filter. Flow monitoring can therefore highlight any problems which may result in flow being temporarily halted to address the issue. Also the real-time indication may provide feedback for adjusting various control parameters, such as operation of pumps or the like.

In general however any ongoing well process, and especially any process wherein the parameters of the process can be varied during the process, may benefit from the method of the present invention.

The optic fibre is preferably located within the well bore in which the process is being performed. In one arrangement the optic fibre runs along the exterior of the well casing, although the fibre could, in some embodiments, be arranged to run within the casing. The optic fibre may be attached to the well casing as it is inserted into the well bore and, if on the exterior of the casing, subsequently cemented in place in those sections of the well which are cemented.

The optic fibre could also be deployed inside the casing. The fibre could be attached to the inside of the casing wall, for instance held in place by clamps or suspended by a suitable hanger on the inside of the casing. Any suitable attachment to the inside of the casing could be employed. For monitoring of production flow a cable could be attached to or part of the production string inserted within the casing.

The fibre therefore follows the general route of the well bore and may extend for the whole length of the well bore casing. For monitoring a process which is localized to a particular section of well bore the fibre preferable extends at least as far into the well bore as the region in which the particular process is being performed. During performance of the process, the fibre can therefore be interrogated to provide one, or preferably a plurality, of acoustic sensing portions in the vicinity of the process (which, for production flow for example, may comprise the whole length of the well). The sensing portions of interest may generally be known from a knowledge of the length along the fibre, and hence the well, or may be determined during actual performance of the process or from a previous performance of the process. For example, when perforation is performed the method may comprise monitoring the acoustic disturbances in the fibre generated by the perforation step. The acoustic disturbances during perforation may be used to determine the portions of the fibre that correspond to the perforation locations. For instance, portions of the fibre which exhibit the greatest acoustic disturbance intensity during perforation may correspond to the location where the perforation charges fired.

In some instances however the method may involve a DAS sensor deployed in a borehole which is different from the one in which the downhole process is being performed. This DAS sensor may be in addition to one deployed within the borehole where the process is being performed and the data from all sensors may be used to provide the real time indication. The data from two sensors may be correlated to provide more accurate positional information for example. In some embodiments however only a DAS sensor in a different borehole may be available, for instance a sensor in an observation borehole or an existing well. The DAS sensor in a different well bore may rely on a fibre which was permanently installed, such as cemented outside the casing of an existing well. However in some instance, if such a sensor is not available, it may be desirable to deploy a sensor by deploying a fibre down the other borehole for the duration of the process being monitored. In some arrangements the optic fibre may be deployed along with other tools or apparatus, for instance a wire line logging apparatus. Such apparatus may already include one or optic fibre that, in use, are deployed between the tool and well head for communication. The DAS sensor could be implemented using such a fibre—either as a redundant fibre or by multiplexing communications and DAS interrogations by time or wavelength for example. Use of a DAS sensor deployed as part of a wire line logging tool can be used in the borehole of interest but clearly this may limit the processes which can monitored and, potentially, the extent of well bore which is monitored. Thus a cable which is deployed along substantially the length of the well bore and which does not interfere with well formation or operation is preferred for a new bore.

Using data from a sensor deployed in a bore hole which is different to the one in which the downhole process is being performed may be used to monitor drilling of a new well. Whilst a new bore hole is being drilled there will not yet be a fibre in place to monitor the drilling process. In this case a fibre in an at least one existing well may be monitored to monitor the drilling process. This may be simply to sound a warning if the signals indicate that the new well bore is getting too close to the existing well or it may actually allow the progress of the drilling process to be monitored.

The real-time indication of acoustic signals may comprise an audible signal representing the acoustic signals detected by at least one longitudinal portion of fibre in the vicinity of the downhole process. In other words the acoustic signals from one or more relevant section of fibre may be played on a suitable audio device. This will provide the personnel controlling the process with audible feedback of what is actually happening down the well bore.

For instance if the method is being employed to monitor the process of drilling, for instance drilling out a blanking plug, the acoustic disturbances from a section of fibre in the vicinity of the drill may be played on an audio device. As the drill moves through the well the section of fibre from which the audio signal is derived may be changed accordingly. The audible playback will effectively allow the operator to listen to the sound of the drill despite the fact that it may be deep underground in a hostile environment. Listening to the sound of the drill will allow for determination of when the drill meets the blanking plug and when the drill exist the blanking plug. Further the real-time audio playback may provide early indication of any problems encountered during drilling and may also allow an identification of the nature of the problem.

During hydraulic fracturing the flow of fluid and proppant will create a background noise signal and fractures will be relatively high intensity transient signals which will sound like cracks to the operators. An operator listening to the signals produced by an acoustic channel of the fibre next to an individual perforation site will therefore be provided with real-time audio feedback of the flow of proppant fluid and any resultant fracturing occurring at that fracture site.

As mentioned the conditions down a deep well bore can be very hostile and especially so during the steps of fabricating the well. Therefore placement of a specific sensor down the well bore whilst various well bore processes are actually being performed has not hitherto been practical. The method of the present invention uses a fibre optic which may to be located on the exterior of the well casing to provide a downhole sensor in the well bore during the downhole process.

In addition to, or as an alternative to, providing an audio playback, the real-time indication may comprise an indication of the intensity of acoustic signals detected by at least one longitudinal sensing portion of fibre in the vicinity of the downhole process. The intensity of one or more selected channels, i.e. sections of fibre, of interest may be displayed on a suitable display.

There are various methods in which the intensity of the selected channels may be displayed. For instance the display may show, for each channel, the current intensity, maximum intensity and/or an average intensity of the acoustic signals over a predefined or selected time period in a histogram type arrangement. Additionally or alternatively the real-time indication may comprise a waterfall plot representing intensity by colour or greyscale and plotting the intensity for each channel against time.

The method may also provide performing frequency analysis on the data and the real-time indication may comprise an indication of the frequency of acoustic signals detected by at least one longitudinal portion of fibre in the vicinity of the downhole process. The indication of frequency may comprise a histogram type plot of current, maximum or average frequency against channel and/or a waterfall type plot with frequency represented by colour or greyscale such as described above. Additionally or alternatively the indication may comprise an indication of the intensity within a particular frequency band and the method may involve dividing the data from the longitudinal sensing portions of the fibre into one or more spectral bands. In other words the data may be filtered so as to include only acoustic disturbances with a frequency within the frequency range of the particular band. Analysing the data by spectral band can more clearly indicate the acoustic difference between various channels in some situations.

By presenting the intensity and/or frequency of the selected channels an operator may be able to determine if there is any significant activity in any particular channel. For detecting the location of a tool or perforation charge within the well bore the disturbances created by the movement of the tool/charge may be monitored by looking at the intensity of various channels.

During drilling of a blanking plug for example an acoustic disturbance at a particular frequency or within a particular frequency band may be expected due to operation of the drill. Monitoring that frequency or frequency band may give an indication of drill location and/or performance.

Providing an audible indication of the data from the DAS sensor and/or providing an indication of the intensity and/or frequency of the data provides useful feedback data that can be generated quickly without an excessive processing overhead.

In addition or alternatively however the step of processing said data may comprise analysing the data to detect an event of interest and the real-time indication may comprise an indication that said event has been detected. An event of interest may be a defined event that may be expected in the normal operation of the process or an event which indicates a problem with the process. Detection of an event of interest may comprise analysing the data for at least one predefined acoustic characteristic. An event of interest may have at least one distinct acoustic characteristic associated with the event. For instance the event may comprise one or more of a particular pattern of intensity and/or frequency. This acoustic characteristic may act as an 'acoustic fingerprint' such that detecting the characteristic is indicative that the particular event has occurred. The method may therefore comprise analysing the data to detect the presence of such an acoustic characteristic. The real-time indication may therefore comprise an indication of whether or not an event of interest has occurred.

The method may further comprise the step of adjusting interrogation parameters to vary the portions of fibre from which data is sampled. In other words the method may involve sampling from a first set of longitudinal sensing portions at a first time and then sampling from a second set of different longitudinal sensing portions at a second time. A section of fibre corresponding to one of the longitudinal sensing portions of the first set may comprise portions of two longitudinal portions of fibre of the second set. The size of the longitudinal sensing portions of fibre in the first set and the second set may be different. The interrogation parameters may be varied adaptively in response to the acoustic data generated. For instance, the whole fibre could be monitored during production flow using a first size of longitudinal portion, for example 20 m sections. If a significant change in signal occurs suddenly in a particular location of the well the interrogation parameters could be changed to reduce the size of the sensing portions, to 1 m sections say, to provide a finer resolution. In this case however, the finer resolution may only be required in the region near the location of interest. Thus only the returns from near the location of interest would need to be processed. This could reduce the amount of processing required to maintain real-time data.

As mentioned above the method provides real-time data that can be used in a method of controlling a downhole process. Such a method of control may comprise: performing the downhole process; monitoring the downhole process using the method described above; and adjusting the operation of the process as appropriate in response to the real-time indication of acoustic signals. The process parameters may be adjusted by an operator in response to said indication or, in some arrangements, at least one parameter of the downhole process may be adjusted automatically in response to the real-time indication.

In another aspect, the present invention relates to a computer program product which, when run on a suitably programmed computer or processor connected to or embodied within a controller for an optical interrogator or a downhole fibre optic, performs the method described above.

In another aspect the present invention provides a method of downhole operation comprising; performing a downhole process; receiving real-time acoustic data feedback from a downhole distributed acoustic sensor regarding the operation of said process; and controlling said downhole process based on said acoustic data feedback. The method thus relates to control of downhole processes based on real-time data regarding acoustic signals from a downhole DAS sensor. The method of this aspect of the invention has all of the advantages and may be used in all of the same embodiments as described above.

The invention also relates to a system for monitoring a downhole process, said system comprising: a fibre optic interrogator adapted to provide distributed acoustic sensing on an optic fibre arranged along the path of a well bore; a sampler arranged to sample a plurality of channels output from said interrogator to provide real-time acoustic data from a plurality of longitudinal portions of said fibre; and an interface device configured to output a real-time indication of the acoustic signals detected by at least one longitudinal sensing portion of said fibre. The system according to this aspect of the invention also benefits from all of the advantages and again can be implemented in all of the embodiments as described above in relation to the other aspects of the invention.

In particular the interface device may comprise an audio device for producing an audible signal based on the acoustic signals detected by at least one longitudinal portion of fibre in the vicinity of the downhole process and/or the interface device comprises a display device and wherein said wherein said real-time indication comprises an indication of the intensity of acoustic signals detected by at least one longitudinal sensing portion of fibre in the vicinity of the downhole process.

The monitoring system may comprise part of a control system for controlling a downhole process, which further comprises a controller for controlling process parameters wherein the controller is responsive to the real-time indication generated by said monitoring system to control said process parameters.

In general the invention relates to the use of distributed acoustic sensing to provide real-time feedback to the operator of a downhole process of the acoustic signals generated by said downhole process.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
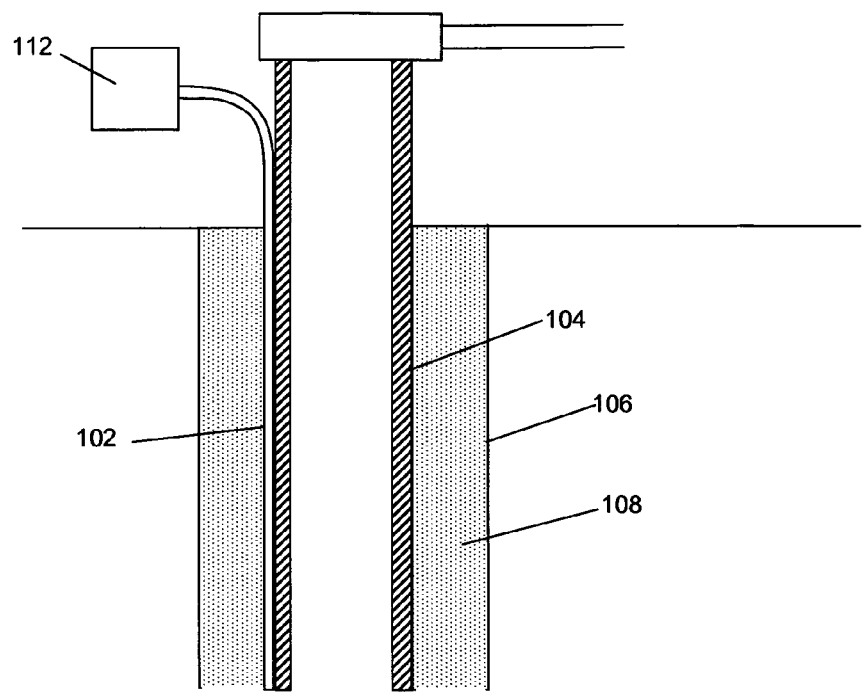
FIG. 1 shows apparatus for monitoring a well using DAS.

A fibre optic cable 102 is included along the path of a well, which in the present example is a gas well, and may be on or offshore. The well is formed at least in part by a metallic production casing 104 inserted into a bore hole 106, with the space between the outer wall of the casing and the hole being back filled with cement 108 in the present example. The production casing may be formed of multiple sections joined together, and in certain instances the sections will have different diameters. In this way the casing diameter is able to narrow gradually towards the bottom of the well. As can be seen in FIG. 1, in this example the fibre passes through the cement back fill, and is in fact clamped to the exterior of the metallic casing. It has been found that an optical fibre which is constrained, for instance in this instance by passing through the cement back fill, exhibits a different acoustic response to certain events to a fibre which is unconstrained. An optical fibre which is constrained may give a better response than one which is unconstrained and thus it may be beneficial to ensure that the fibre in constrained by the cement. The difference in response between and constrained and unconstrained fibre may also be used as an indicator of damage to the cement which can be advantageous will be described later.

The fibre protrudes from the well head and is connected to interrogator/processor unit 112. The interrogator unit injects light into the fibre and senses radiation backscattered from along the length of the fibre. The particular form of the input light and sampling/processing capability of the unit allows simultaneous output of multiple data channels, each channel corresponding to acoustic data sensed along a particular section of the fibre at a particular distance along the fibre. While the interrogator/processor unit is shown here as a single item, hardware may be divided among, for example, an interrogator box providing a raw data output, feeding a PC or portable computer to provide the data processing capability.

Figure 6:
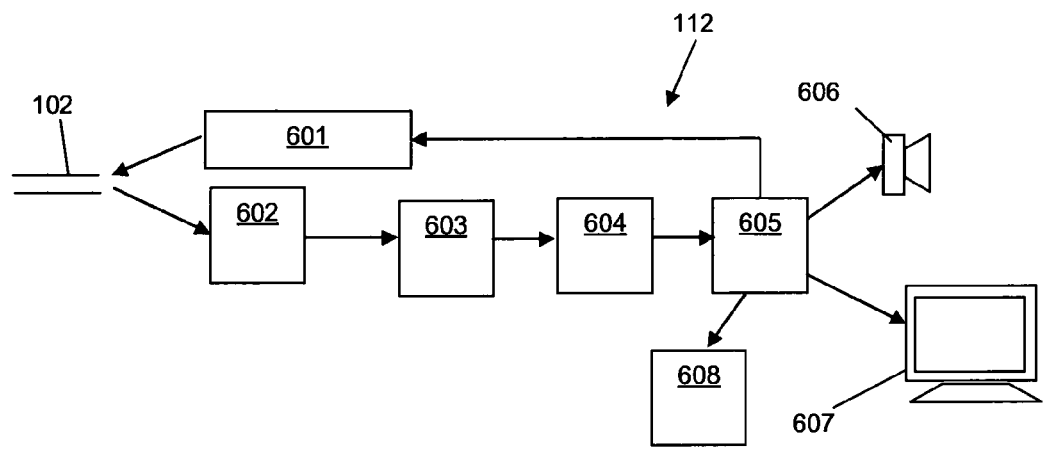
FIG. 6 illustrates an embodiment of an interrogator.

FIG. 6 illustrates the operation of interrogator unit 112. A laser module 601 is optically coupled to the optic fibre 102 by a suitable optical coupling means (not shown). The laser module transmits optical pulses of a defined duration and frequency into the fibre, for instance as described in GB2442745, pairs of pulses having a defined frequency difference may be transmitted into the fibre. Backscattered radiation is coupled to a photodetector module 602 which detects radiation which has been Rayleigh backscattered within the fibre. As taught in GB2442745 radiation at the frequency difference of the transmitted pulses may be detected.

The data from the photodetector module 602 may be passed to a filter module 603 which may filter the data for the acoustic frequencies of interest. Filter module 603 may, for example, comprise a high pass filter. The data may then be passed to an FFT module 604 for performing an FFT, prior to being passed to a processor module 605 for generating the real-time indication.

Using commercially available components in such an interrogator it is possible to provide an indication of the acoustic disturbances (which include, for the purposes of this specification, any type of mechanical vibration or disturbances such as pressure and seismic waves) encountered from each of at least 4000 separate channels in real-time. However in some applications data may only be of interest from a subset of all available channels of the fibre. Therefore the interrogator may be arranged to process data from the relevant channels only. This may reduce the amount of processing required and thus reduce any processing delays.

When the apparatus is arranged to provide a real-time indication of the acoustic signals to an operator or controller of a process the real-time indication provided may be visible, via a display device 607, or audible, via an audio device 606, or both and may, for instance, be provided to a control room or via a mobile device at a control station.

Figure 2:
FIG. 2 illustrates the output of the system of FIG. 1.

An example of the type of possible data output from the arrangement of FIGS. 1 and 6 is shown in FIG. 2. Here channel (longitudinal sensing portion) number (and hence depth for substantially vertical wells) is displayed along the y axis, with zero representing the channel nearest the surface. 400 channels are shown. Time is displayed along the x axis, to provide a 'waterfall' plot which is continuously refreshed as new data is made available. Detected energy intensity is shown as colour or greyscale in the upper plot 202, using a scale shown on the right hand side to provide a 2D visualisation of the acoustic energy distribution along the entire sensed length of the fibre at each of a series of time instants.

This type of waterfall plot can allow an operator to see at a glance where there is significant acoustic activity within the well bore. It also will provide a clear indication of any significant changes in acoustic disturbances. For example consider that the whole well is relatively quiet and experiencing background noise only. A sustained increase in acoustic activity from one of more channels will show up by a change of colour against the relatively quiet background. This in itself will be useful information that something has changed. If the increased disturbance continues, and at the same location, the waterfall plot will start to show a horizontal line of increased activity. If however the location of the disturbance moves then the relevant channels affected will also change and there waterfall plot be show an inclined line. If there is a sudden event which affects several channels but then stops there will be a vertical line. The waterfall plot therefore provides a very useful visual indication of the acoustic events happening down the well.

Depending on the depth of the well and the size of the acoustic channels it may not be possible to display each channel individually on a plot for the whole extent of the well. For instance a well bore 5 km long, interrogated with channels of 2 m length say would produce 2500 separate channels. When displaying the whole extent of the well the channels may be grouped together and the average intensity of disturbances displayed. However an operator may be able to select any section of well and see a finer resolution waterfall plot for the area, eventually down to a waterfall plot showing individual channels.

As well as displaying the general acoustic intensity detected it may be useful in some instances to detect transient acoustic events, especially for processes such as perforation and fracturing. It may also be useful to perform some frequency analysis. The central plot 204 shown in FIG. 2 shows the same data after undergoing transient detection (as will be explained in greater detail below) and the lower plot 206 shows the frequency of the detected transients according to the scale to the right of the plot. In the middle 204 and lower plots 206, depth from 0 to 4000 m is represented on the y axis, with time from 0 to 10000 s on the x axis. The arrangement is such that data is available from all channels at every sample period, although, as mentioned, an operator may select one or more subsets of channels for display and/or the data processor may automatically display a subset of interest in response to certain conditions.

Figure 7:
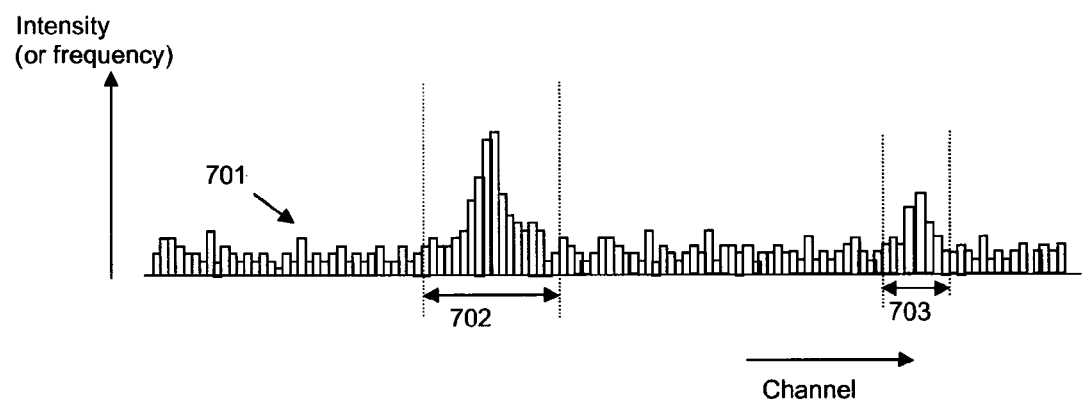
FIG. 7 shows an example of a histogram type plot of real-time indication of detected acoustic signals.

In addition to a waterfall type plot it may be useful for the real-time indication to comprise a histogram type plot such as shown in FIG. 7. A histogram type plot can be used to display the intensity of each channel or, depending on the scale of display, the average intensity of groups of channels. Alternatively the same arrangement may be used to display the frequency of each channel or groups of channels. In some arrangements the histogram may be limited to showing the intensity at a particular acoustic frequency or frequency range or alternatively the frequency of signals within a certain intensity range.

Referring to the example plot 701 shown in FIG. 7 it can clearly be seen that the channels in area 702 are exhibiting a greater intensity that the ambient noise levels detected by most of the other channels. Further the channels in area 703 are also experiencing acoustic disturbances. Were such a plot obtained during a process being conducted in area 702, such as fracturing, this could be an indication that something unexpected was occurring in area 703 and be indicative of a problem. However if a process were expected to result in a disturbance in both areas 702 and 703, such as inflow from separate perforation sites, the relative difference in intensity could indicate uneven conditions. For instance a sand screen at location 703 could be mostly blocked.

It will therefore be clear that providing these types of real time visual indication can provide actual feedback of what is currently happening down the well when the process is being performed.

In addition to providing a visible display, for instance in a control room or the like, a particular acoustic channel may be selected for audible playback. In other words the operator can get to listen to the signals detected by a particular section of fibre. In essence the relevant section of fibre acts as a microphone. The ability to listen, in real time, to signals at a section of well deep underground during various well processes is believed to be novel. By listening to the signals detected the operator can get a feel for the process and how is it progressing. By swapping between various channels at different locations of a process which is occurring at various sites the operator can determine whether there are any significant differences at the various sites and/or whether any changes to the process parameters have had any significant effect.

For example during the process of drilling out blanking plugs the drill operator may listen to the channels near to the drill. The acoustic channel can track the drills progress down the well, either automatically or by operator selection. When the drill encounters the blanking plug the sound of the drilling operation can be relayed to the operator who will then have some indication of how the drilling process is going and who may be able to adjust the drill operation accordingly.

In addition to providing the audible and/or visual feedback regarding the acoustic signals detected during the downhole process the acoustic signals from some or all sensing portions of the sensing fibre may be analysed for signals which are characteristic of an event of interest. As the skilled person will be aware acoustic signatures analysis may be performed to detect acoustic signatures which are representative of some specified events. The acoustic signature analysis may comprise analysing the evolution of the signal from a longitudinal sensing portion of the fibre against a known signature. In some embodiments the signals from more than one adjacent sensing portion of fibre may be analysed together to detect a particular characteristic. If a characteristic of an event of interest is detected then an alarm or alert may be generate for an operator.

Whilst the discussion above has focussed on providing feedback to a human operator in some embodiments the real-time indication may be used to automatically control at least some parameters of the downhole process. Referring back to FIG. 6 the processor module 605 may be arranged to provide the real-time indication to a control unit 608 for controlling at least one aspect of the downhole process. The controller 608 may simply be a cut-off or emergency stop type unit for halting the process if a problem is detected but in other embodiments the controller adjusts parameters of the process in use and the real-time indication from processor module 605 is used in a feedback loop.

In some embodiments the characteristics of the interrogation may be changed in response to the real-time data processor module 605 may provide a control signal to laser module 601. For example, during flow monitoring when the well is in use the channels may be a first size, say 20 m for example, and all channels of the well bore (say 250 for a 5 km well) may be analysed. If a significant change is detected in any channel the size of the channels may be reduced, for instance to 1 m or so and the 250 channels in the vicinity of the event analysed to give a finer resolution.

It is proposed to use the system described above to monitor various downhole process including apparatus placement, perforation charge firing, fracturing, blanking plug drilling and fluid flow for example. In addition the system may provide general condition monitoring and, in some arrangements, may also allow communication with downhole sensors Apparatus Location The method may comprise using a DAS sensor to monitor the process of locating apparatus within the well bore, for instance for correct deployment of a blanking plug, a measurement or other tool or for correct location of perforation charges.

In vertical wells the tool may be lowered into the well until a certain length of cable has been deployed and the amount of cable used as a measure of the position in the well. In wells with horizontal sections a tractor device may have to be deployed in the well to move the apparatus into position. Again a length of cable attached to the apparatus may be used to determine the location.

By monitoring deployment of the apparatus the location may be independently provided by noting the acoustic disturbances caused by the deployment of the apparatus, i.e. detecting the sounds made by the apparatus banging against the walls of the casing for instance or the sound made by the tractor unit on the casing. These disturbances can be detected as relatively intense events occurring in particular sensing portion of the fibre, with the relevant sensing portion of the fibre providing another way of determining the position of the tool. A tractor device may also be detectable at a characteristic frequency associated with the power unit for example.

The progress of the apparatus could therefore be monitored on an appropriate waterfall diagram for the relevant section of well and the deployment stopped when the desired location is reached.

Perforation Charge Firing

In one embodiment of the present invention a DAS sensor is used to monitor the perforation events. Monitoring the perforation event can serve at least two distinct purposes. Firstly the location of the perforation can be determined. It can be difficult to control exactly the direction of the perforation in a borehole and so detecting the location of the perforation can aid in control and planning of further perforations. Also the acoustic signature of the perforation event may be compared to certain expected characteristics to determine whether the perforation occurred satisfactorily. A string of perforation charges may be located in a particular section of well and fired in a sequence. By providing real-time feedback regarding the acoustic disturbances when one or more perforation charges are fired the operator of the perforation firing may be able to adjust the location of the next charge, fire a different type of charge, halt the perforation process to deal with a problem or have satisfactory feedback that the process should be continued as planned. The ability to detect perforation type events will be described later.

In addition to monitoring the perforation itself the perforation event is a relatively high energy event which acoustically excites a large proportion of the well bore, i.e. the casing, the cement, any blanking plugs already in place etc. The acoustic response to a perforation event allows an acoustic profile of the well bore to be collected and assessed.

Acoustic data is sampled at between 0.2 Hz and 20 kHz over the length of the drilled hole during a perforation event. The energy present in each channel is monitored by either a bandpass filter and then an rms energy calculation, or by performing an FFT and summing power between an upper and lower frequency band (typically 512 pt FFT, 50% overlapped, filtered between 300 and 5 kHz if sampling rate is practical). A 2D data array of detected energy for time and depth (or position) can be produced.

Figure 3:
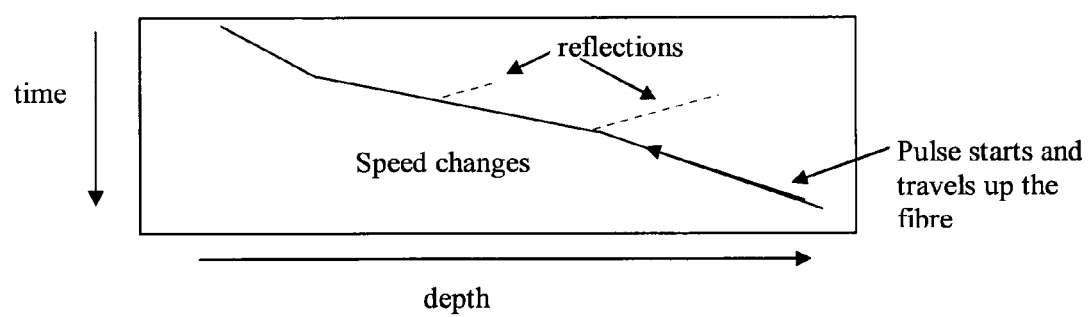
FIG. 3 is a schematic representation of a perforation event as monitored by an embodiment of the present invention.

Further processing of the data array by identifying peaks reveals that the impulsive perforation signal propagates up and down the well casing as well as into the rock. An energy plot as described above can therefore be produced, and a trace can be identified tracking the progress of the pulse as shown in FIG. 3.

The gradient of the identifiable trace can be measured, as it is the rate at which the energy is propagating through the well casing. This gives a measure of the transmission speed in the medium. This can be used to indicate areas of the well casing that are different because their transmission speed changes. This could indicate a problem with the casing attachment, or structural issues in the casing itself.

An automated tracking algorithm could be used to calculate the speed of this energy trace and determine areas where the speed changes.

The proposed algorithm would work on the assumption that the event of interest is much larger than the normal state of the well, so that the peak in energy identified as the perforation event can be reliably identified. Then the peak can be associated over successive time frames, and the average speed over 1, 2, 3, . . . 10 s can be calculated. Further improvements could track multiple peaks at the same time (useful for distinguishing the main pulse in the case of multiple reflections).

Further inspection of FIG. 3 shows clear points of reflection of energy. These arise at joins in the casing and can provide an engineer with information concerning the quality of the joins across the length of the casing. Anywhere there is a significant mismatch in material, a partial reflection may occur, and the larger the mismatch, the greater is the reflection coefficient. Other material failures such as cracks or pitting could significantly affect the propagation of the energy along the casing and fibre, and may be identified using this method.

For instance the condition of the cement surrounding the casing may be assessed. The acoustic response of the cement may vary in areas where there is a significant void in the cement, either due to manufacturing as the result of an earlier perforation or fracturing event. Voids in the cement can be problematic because if a subsequent perforation occurs in an area of void when the proppant is pumped into the well bore it may not flow into the perforations in the rock but into the void—wasting a large amount of proppant and halting well formation whilst the problem is addressed.

As mentioned above the response of an unconstrained fibre is different to that of a constrained fibre and thus if the fibre does itself pass through a void in the cement, and thus is unconstrained in that area, the acoustic response will be very different. Thus the present invention may include detecting voids in the cement surrounding the casing.

The positioning and condition of blanking plugs can also be assessed in this way.

Fracture Monitoring

Once the perforations have been made the fluid and proppant is flowed into the well to cause fracturing. The acoustic responses of the acoustic channels of fibre in the vicinity of the perforations may be monitored. Flow of the high pressure fluid containing a solid particulate through the casing 104 creates lots of acoustic disturbance and all channels of the fibre that correspond to sections of the well bore in which flow is occurring will generate show an acoustic response. However it has been found that the acoustic channels in the vicinity of the perforation sites exhibit an acoustic response which is related to the flow of fracture fluid into the perforation site and the fracturing occurring. The acoustic energy of the channels of the fibre in the vicinity of the fracturing sites may therefore be displayed to an operator of the fracturing process, for instance in a waterfall and/or histogram type plot.

It has also been found that this response can be seen most markedly by looking at discrete frequency bands of the acoustic disturbances. The signal returns may therefore be processed in a number of different frequency bands and displayed to an operator, either simultaneously (e.g. in different graphs or overlaid curves of different colours) or sequentially or as selected by the user. The data may also be processed to automatically detect the spectral band that provided the greatest difference between the intensity at channels in the vicinity of the perforation site and channels at other sections of the well.

By displaying such a graphical representation to an operator in real time the operator receives information that allows him the see how the fracture process is progressing and if there are any problems with the fracture process. The value of intensity and/or frequency of the acoustic signal corresponding to fracture fluid flowing into a perforation site and causing fracturing may also be analysed to determine some parameters about the fractures, such as general size of the fractures and/or rate of fracturing.

In addition to providing a visible display a particular acoustic channel may be selected for audible playback. By listening to the signals detected the operator can get a feel for the fracturing process and how is it progressing. By swapping between the channels associated with the various fracture sites the operator can determine himself whether there are any significant differences in fracturing at the various perforation sites and/or whether changes to the flow parameters have had any significant effect.

As mentioned above in some instance the fracture fluid may not flow into the rock and proppant wash-out may occur. The flow of proppant fluid in normal operation will generally proceed at a certain rate and with a certain characteristic. If the fluid finds another path or ceases to fracture correctly the flow conditions within the well may change. The acoustic response during proppant fluid flow may therefore be monitored to detect any significant change. If a different part of the casing fails this may be apparent by the sudden appearance of a signal at a different part of the well bore. Detection of such a component may be used to generate a real time alarm to an operator.

Figure 4:
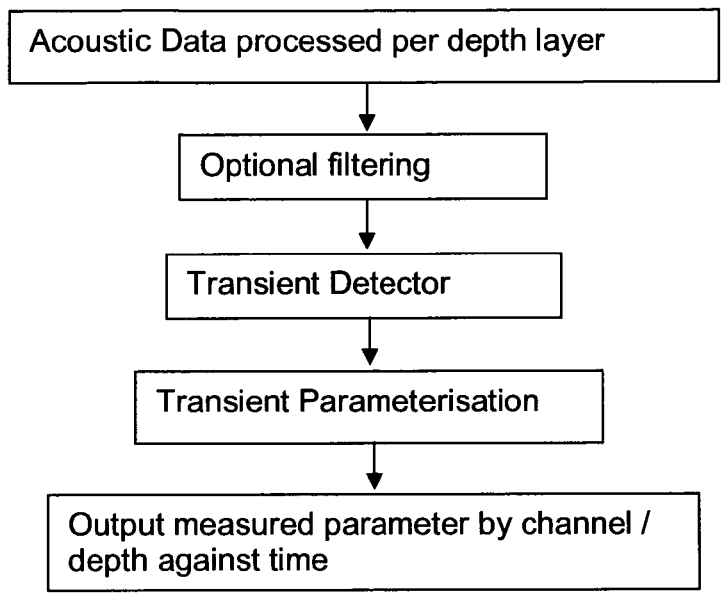
FIG. 4 illustrates seismic detection and parameterisation steps for fracture monitoring.

Further seismic and fracture events of interest are of a distinctly different nature from the continuous flow noise caused by the high pressure influx of water and sand during the fracturing process. Generally they are characterised by being short and impulsive events—hereafter referred to as transient events. A technique looking at short term variations away from the mean variable levels (the transient detector) will extract these events from background and long period noise. The general processing method is set out in FIG. 4.

By processing the acoustic data received to highlight transient events in this way, a fracture event can be detected and observed, and the following parameters can be determined:

The depth at which fracture is occurring can be determined according to the channel at which fracture events are detected.

The rate at which fractures are occurring, or fracture density, can be determined according to the number and/or intensity of detected fractures over a defined period or depth range.

A measure of fracture magnitude can be determined according to the measured duration of a fracture, and also the span of a fracture defined as the number of channels affected by a single event.

An estimate of range from the well can be made based on the frequency characteristics of a fracture event. To provide a single parameter for frequency, the mean frequency of the spectral shape of the event can be used. Other frequency parameters which can be determined include second order statistics such as skew and kurtosis.

In order to identify transients among other background data a measure of short term variability is compared with the normal or an average variability for a given channel.

In the present example this is achieved by populating statistics representing the mean energy and the mean absolute deviation about the mean (MAD: mean of absolute difference of current value and mean value).

These two statistics are updated by exponential averaging as each data update is received, using a decay term, N.

$$\text{Mean data} = ((N-1)/N)^* \text{mean data} + (1/N)^* \text{new Data}$$

$$\text{MAD} = ((N-1)/N)^* \text{MAD data} + (1/N)^* \text{abs(new Data} - \text{mean data)}$$

Where the data first undergoes an FFT and where calculations are performed per channel and per frequency cell.

The transient level is then defined as:

$$\text{Abs|new data} - \text{mean data|/MAD}$$

This gives a value relating to how much a particular frequency cell is higher in variability than its average variability. Hence very variable channels are self regulating and it is only excessive and unusual variability that is detected. By varying the values of N the algorithm can be tuned to detect different length transient events. Typically factors of 4, 6, 8, . . . 128 are used but these depend on the length of the transient required and the FFT rate of the system. By performing this process in the frequency domain, a high degree of control is achieved over the frequencies used to form a transient event, and knowledge of the transient spectral structure is calculated and preserved for feature extraction.

The algorithm adaptively selects an exponential factor according to whether a transient is triggered. When recalculating the mean and medium values, if a frequency cell is above threshold as a detection it will use a different value for N (in this example 100 N is used) meaning that the transient event is included in the general statistics at a much reduced rate compared with the normal events.

The location of fracture events may also be monitored to allow fracture mapping or fracture density mapping. In a typical production environment there may be several wells in the same oil or gas field. Ideally each well taps a different part of the field. However, it is possible for the fractures created in one well to run into the same area as the fractures from another well. In this instance the new well may not increase production as any production at the new well decrease production at the old well. It is therefore desirable to monitor the location of fractures. The use of a DAS system offers the ability to detect and monitor where the fracture event are occurring in real time, thus allow control over the fracturing process.

It has surprisingly been found that DAS systems may be used to separately detect P and S waves. P waves (pressure or primary waves) are longitudinal waves which propagate through solid material. S waves are shear waves or secondary waves which are transverse waves. Co-pending patent application PCT/GB2009/002055, the contents of which are hereby incorporated by reference thereto, describes how a DAS system can be used to detect P and S waves and discriminate between them. Detecting the S waves of the fracture event may allow the location to be determined. To determine the location of the fracture event multiple fibres and/or time of arrival type techniques may be used as described in co-pending application no. GB0919904.3, the contents of which is hereby incorporated by reference thereto.

Further it will be noted that the S wave, being a transverse wave, will have a shear direction associated with the wave. Detection of the different components of the S wave will allow a determination of the orientation of the fracture. This is particularly useful as fractures in the horizontal plane are not preferred as the injected sand is generally insufficient to keep the fracture open given the weight of rock above. A vertical fracture is thus preferred. To detect the orientation of the S wave the incoming wave may be resolved into components in three dimensions. By arranging one or more sensing fibres in three dimensions the components of the incident wave may be resolved. The use of a fibre optic which preferentially responds in one direction may help resolve an incident acoustic wave into its components, as described in co-pending application GB0919902.7, the contents of which are hereby incorporated by reference thereto.

Blanking Plug Drilling

After all perforation and fracturing steps are completed it is necessary to drill out the blanking plugs that were inserted to block off sections of the well. The monitoring method may be used to guide the drill to location of the blanking plug (the location of the blanking plugs may have been determined during a perforation event as described earlier) and to monitor the drilling process. During drilling an audible signal from a channel located at the blanking plug may be played audibly to the drill operator for real-time feedback as to how the drilling is going. Other channels may also be monitored for acoustic disturbances that may indicate failure of the well.

Inflow Monitoring

The monitoring of fluid such as oil and gas flowing into a well from neighbouring rock formations typically requires much greater sensitivity than any of the previous techniques as it looks for the characteristic sound of oil or gas as it enters the casing pipe, a relatively quiet and subtle noise source. Detecting and quantifying the areas of inflow within a well is possible by analysing a 3D data set of detected activity by distance/depth over a time period, as can be shown using a 2D 'waterfall' energy map.

Figure 5:
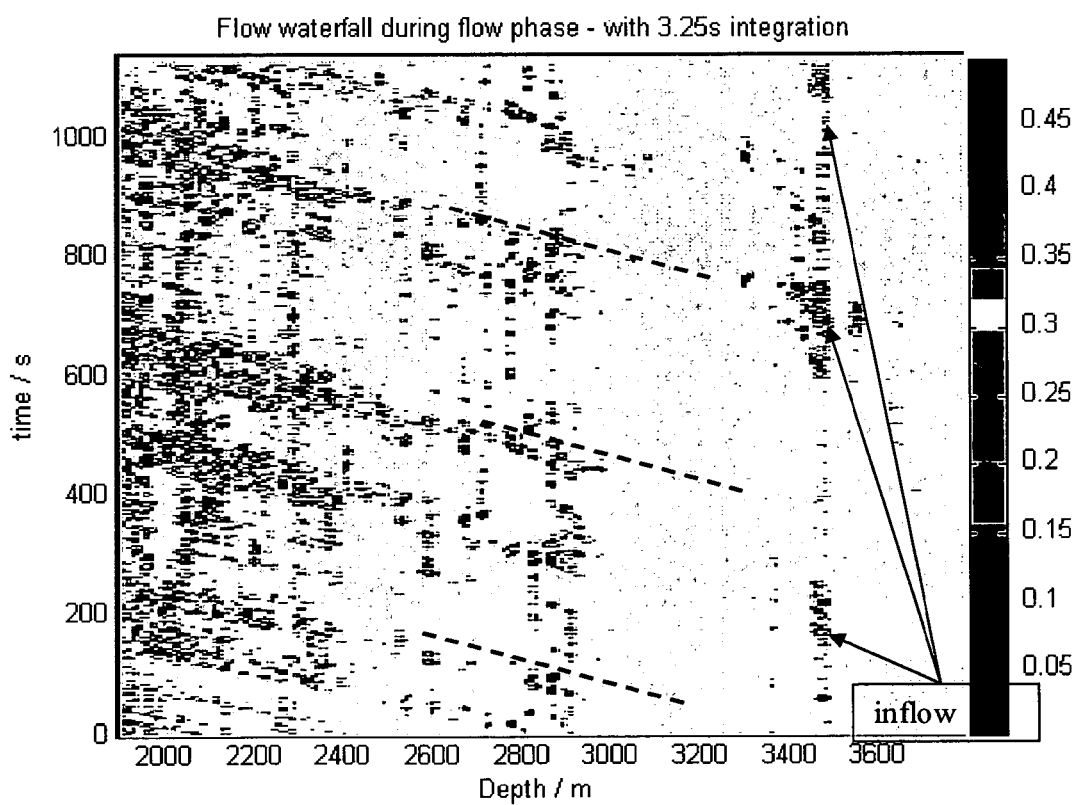
FIG. 5 shows the results of inflow monitoring having been enhanced using variance statistics.

The effects of interest may be subtle and may typically manifest themselves as variations within the noise structure rather than easily discernible features above the noise as seen in perforation detection. Reliability and accuracy of detection can be improved by emphasising areas where the energy varies in a characteristic way. The variance statistics rather than the direct energy of each channel were examined over short periods of time and used to provide indications of inflow. As can be seen in FIG. 5 this technique shows more clearly the area of inflow (marked by an arrow) and the diagonal structures (emphasised with dashed line) caused by energy or material moving up the pipe.

Multiple methods of monitoring and parameterisation have been described above, and the different characteristics of the signals being and analysed (frequency content, amplitude, signal to noise) place a wide range of demands on the sensing apparatus. Due to the large dynamic range and the relatively high sampling rates of the DAS monitoring system however, all of the above monitoring and processing can be performed using the same system as shown schematically in FIG. 1.

In addition, and as mentioned above, the configuration of the channels can also be adjusted, and different channel settings can be used for different monitoring operations. The channel settings can also be adaptively controlled in response to monitored data, for example if a significant fracture density occurs at a certain depth, it may be desirable to monitor that particular depth with greater resolution for a period of time, before reverting to the original channel configuration.

In this way a complete monitoring program can be run by a single system over a whole sequence of well operations from perforation to fluid inflow. The system can be arranged to transition from one type of detection to another in response to detected events, and can adaptively vary both sensing and data processing parameters for a given monitoring/detection activity.

In addition the DAS system may be used as a means of communicating with downhole sensors. US2009/0003133 describes a method of transmitting data from down well sensors and the like using acoustic using the casing itself as an acoustic medium. Instead the acoustic fibre may be used to receive encoded acoustic signals. Using the optic fibre means that the downhole sensors can generate much less intense acoustic signals, requiring much less power to generate. Thus battery life of the sensor can be extended. Further detection of acoustic signals via the optical fibre is far more reliable than transmitting via the casing. Co-pending application GB2010/000602 describes an acoustic transducer suitable for use in this environment.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of monitoring a downhole process comprising:
   repeatedly interrogating an optic fibre arranged along the path of a well bore to provide distributed acoustic sensing;
   sampling data gathered from a plurality of longitudinal portions of said fibre;
   processing said data to provide a real-time indication of the acoustic signals detected by at least one longitudinal sensing portion of said fibre; and
   adjusting interrogation parameters to vary the portions of fibre from which data is sampled in response to said acoustic signals detected.

2. A method as claimed in claim 1 wherein the said optic fibre is arranged in the well bore in which said downhole process is being performed.

3. A method as claimed in claim 1 wherein said real-time indication comprises an audible signal representing the acoustic signals detected by at least one longitudinal portion of fibre in the vicinity of the downhole process.

4. A method as claimed in claim 1 wherein said real-time indication comprises an indication of the intensity of acoustic signals detected by at least one longitudinal sensing portion of fibre in the vicinity of the downhole process.

5. A method as claimed in claim 1 wherein said step of processing said data comprises performing frequency analysis.

6. A method as claimed in claim 5 wherein said real-time indication comprises an indication of the frequency of acoustic signals detected by at least one longitudinal portion of fibre in the vicinity of the downhole process.

7. A method as claimed in claim 1 wherein the step of processing said data comprises analysing the data to detect an event of interest and said real-time indication comprises an indication that said event has been detected.

8. A method as claimed in claim 7 wherein said step of analysing said data comprises analysing the data for at least one predefined acoustic characteristic.

9. A method as claimed in claim 1 wherein said downhole process comprises one of: perforation charge placement; perforation charge firing; hydraulic fracturing; tool deployment; drilling of plugs; and production flow.

10. A method as claimed in claim 1 wherein the steps of interrogating the fibre, sampling data and processing data comprise launching a series of optical pulses into said fibre and detecting radiation Rayleigh backscattered by the fibre; and processing the detected Rayleigh backscattered radiation to provide a plurality of discrete longitudinal sensing portions of the fibre.

11. A method as claimed in claim 1 wherein said optic fibre is single mode fibre which is, absent of any external stimulus, free of any substantial change of optical properties along its length.

12. A method as claimed in claim 1 where the longitudinal sensing portions of fibre are 10 m or less in length.

13. A method according to claim 1 wherein said sampling is performed at a sampling rate greater than or equal to 5 kHz.

14. A method according to claim 1, wherein at least 250 channels are sampled simultaneously.

15. A method of controlling a downhole process comprising:
   performing said downhole process;
   monitoring said downhole process using the method as claimed in any preceding claim; and
   adjusting the operation of said process as appropriate in response to said real-time indication.

16. A method as claimed in claim 15 wherein said method comprises automatically adjusting at least one parameter of said downhole process in response to said real-time indication.

17. A non-transitory computer program product which, when run on a suitably programmed computer connected to or embodied within a controller for an optical interrogator or a downhole fibre optic, performs the method of claim 1.

18. A system for monitoring a downhole process, said system comprising:
   a fibre optic interrogator adapted to repeatedly interrogate an optic fibre arranged along the path of a well bore to provide distributed acoustic sensing;
   a sampler arranged to sample a plurality of channels output from said interrogator to provide real-time acoustic data from a plurality of longitudinal portions of said fibre; and
   an interface device configured to output a real-time indication of the acoustic signals detected by at least one longitudinal sensing portion of said fibre wherein said fibre optic interrogator is configured to adjust the interrogation parameters to vary the portions of fibre from which data is sampled in response to said real time acoustic signal detected.

19. A system according to claim 18 wherein said interface device comprises an audio device for producing an audible signal based on the acoustic signals detected by at least one longitudinal portion of fibre in the vicinity of the downhole process.

20. A system according to claim 18 wherein said interface device comprises a display device and wherein said wherein said real-time indication comprises an indication of the intensity of acoustic signals detected by at least one longitudinal sensing portion of fibre in the vicinity of the downhole process.

21. A system for controlling a downhole process comprising:
   a controller for controlling process parameters; and
   a monitoring system as claimed in claim 18; wherein
   said controller is responsive to said real-time indication generated by said monitoring system to control said process parameters.

* * * * *